United States Patent [19]
Attwood

[11] 4,065,718
[45] Dec. 27, 1977

[54] MULTIPATH COMMUNICATIONS SYSTEM
[75] Inventor: Stanley W. Attwood, Scottsdale, Ariz.
[73] Assignee: Motorola, Inc., Schaumburg, Ill.
[21] Appl. No.: 756,046
[22] Filed: Dec. 30, 1976
[51] Int. Cl.² .............................................. H03C 3/08
[52] U.S. Cl. ....................................... 325/65; 325/44; 325/52
[58] Field of Search ....................... 325/65, 60, 44, 26, 325/42, 52, 323, 325, 472, 473, 132; 343/100 CS

[56] References Cited
U.S. PATENT DOCUMENTS

| | | | |
|---|---|---|---|
| 2,935,604 | 5/1960 | Di Toro | 325/44 |
| 3,337,870 | 8/1967 | Allen et al. | 325/65 |
| 3,356,947 | 12/1967 | Toro | 325/65 |
| 3,440,569 | 4/1969 | Hutchison | 325/65 |
| 3,472,126 | 10/1969 | Ghenard | 325/132 |
| 3,537,008 | 10/1970 | Lakatos | 325/65 |
| 3,641,433 | 2/1972 | Mifflin et al. | 325/65 |
| 3,679,983 | 7/1972 | Theriot | 325/65 |

Primary Examiner—Robert L. Griffin
Assistant Examiner—Tommy P. Chin
Attorney, Agent, or Firm—M. David Shapiro

[57] ABSTRACT

A communications system utilizing a noisy reference signal and a noisy information signal wherein the information signal is delayed from the reference signal as a function of the information modulation and then the two signals are combined for simultaneous transmission. The receiver amplifies the combined signal and delays it by a predetermined amount corresponding to the delay in the transmitter. The delayed and undelayed signals are autocorrelated to reconstruct the information signal. The system provides for autocorrelation of signals which have traveled a plurality of signal paths from transmitter to receiver.

2 Claims, 4 Drawing Figures

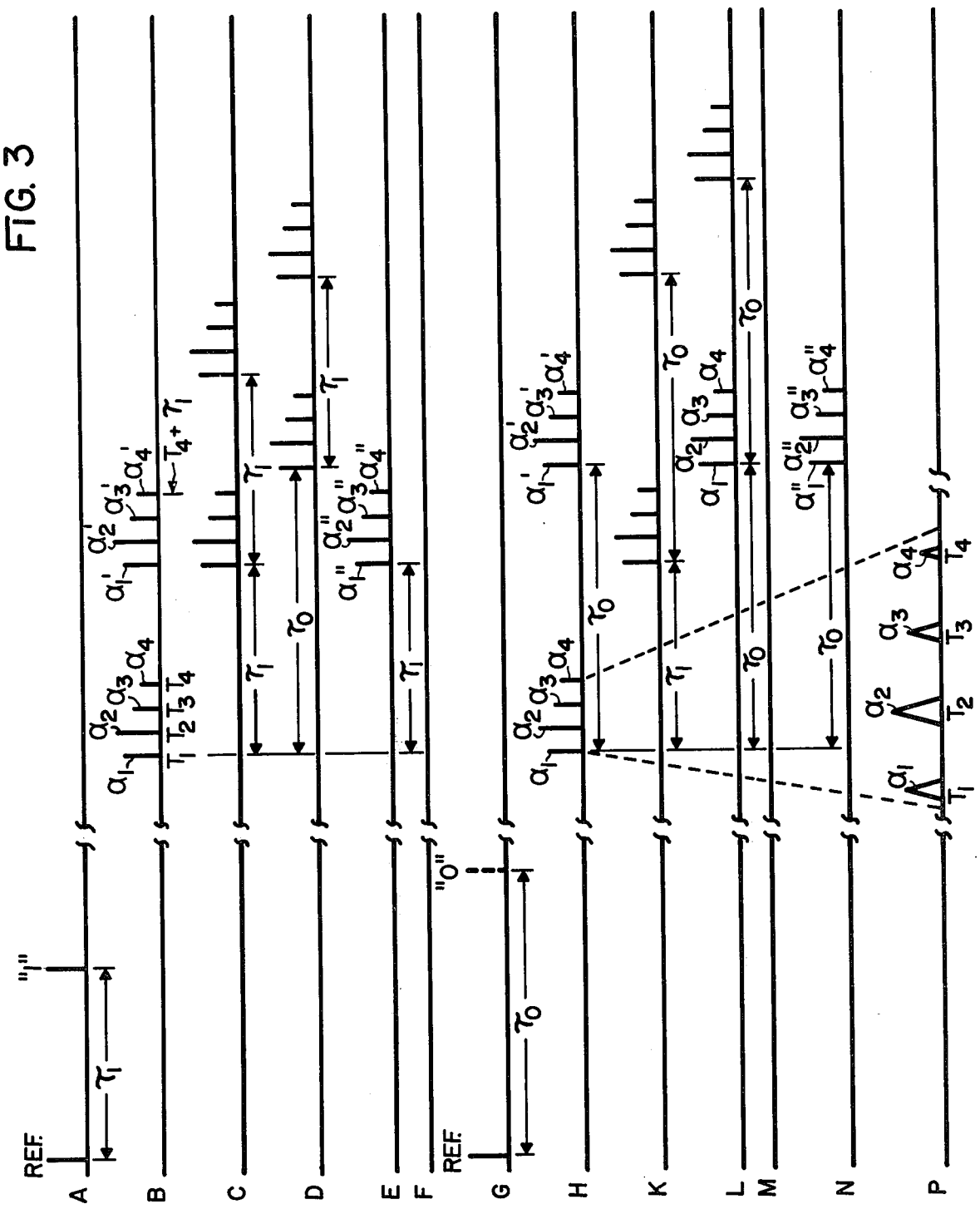

MULTIPATH COMMUNICATIONS SYSTEM

FIELD OF THE INVENTION

The invention relates to a communications system for autocorrelation of communications signals which have traversed a plurality of paths from transmitter to receiver.

BACKGROUND OF THE INVENTION

Communications systems are frequently plagued with multipath transmission problems; that is, one signal portion is propagated directly from transmitter to receiver in a straight line/shortest-distance and time manner while other signal portions are propogated via reflecting objects resulting in varying delays in arrival times at the receiver.

Prior art systems have attacked the problem in various ways; some examples are described by Laksatos in U.S. Pat. No. 3,537,008. The solution of the Laksatos patent utilizes multiple phase synchronized carrier frequencies carrying a summed continuous pilot signal, a summed pulsed pilot signal and a summed message signal. A receiver is provided to separate the plurality of carrier signals, one from the other, and reconstruct the two pilot signals and the message signal by means of at least a series of filtering, delay measuring, and signal simulating circuits. No provision is made for recovery of the energy in the multipath transmission other than that energy traveling the direct (shortest) path from transmitter to receiver.

Most techniques for handling the multipath communications problem may be classified as diversity schemes. Receivers are used which are spaced geographically, in frequency, or in antenna polarization. The signals from the diverse receivers are then combined at a given point in the circuit to provide optimum signal to noise ratio or to maximize the sensitivity of the receiver complex.

SUMMARY OF THE INVENTION

The present invention overcomes the multipath problems and other problems as they are described in the prior art by utilizing a noisy reference signal transmitted in combination with a time delay modulated version of the same noisy signal wherein the two noisy signals are superimposed and transmitted simultaneously. In the receiver, the two signals are processed in two channels having a differential fixed delay therebetween. The autocorrelation function of the two channels is therefore a function of the modulation delay imposed by the information signal in the transmitter.

According to one aspect of the invention, a noise carrier signal is used as a reference signal which is time delay modulated by an information signal and the reference and delayed signals are combined for simultaneous transmission.

According to another aspect of the invention, a combined noise reference and time delayed signal are processed in a receiver having a dual channel signal processing circuit for providing a predetermined differential time delay therebetween.

According to still another aspect of the invention, auto-correlation techniques are utilized to recover the information signal from a combined noise reference and time delayed noise signal after delaying the combined signal and comparing it to an undelayed combination signal.

According to yet another aspect of the invention, autocorrelation techniques are utilized to reconstruct multiple received signals caused by multipath propagation of a combined noise reference and time delayed noise signal in a receiver having a predetermined fixed delay time in one of two receiving channels with respect to the other of two receiving channels whereby the delayed and undelayed received signals are processed in autocorrelation circuits to retrieve the information signal.

These and other aspects of the invention will become clear upon inspection of the Detailed Description of the Invention and the Figures in which:

FIG. 1 is illustrative, in block diagram form, of a preferred embodiment of the transmitter of the invention, FIG. 2 is illustrative, in block diagram form, of a preferred embodiment of the receiver of the invention, FIG. 3 shows timing diagrams of key portions of a preferred embodiment of the invention, FIG. 4 shows, in graph form, the response of the receiver of a preferred embodiment of the invention, illustrating output amplitude as a function of time delay which is, in turn, a function of the applied information signal.

DETAILED DESCRIPTION OF THE INVENTION

The invention comprises a system for more efficiently recovering the information signal from a communications signal which has been subjected to the multipath propagation phenomena. Multipath propagation causes the receiver in the system to "see" incoming signals at a multipath of delay times due to the inherent delay caused by propagation time over a path including a reflective element vis-a-vis a single direct, line-of-sight path. Where a plurality of reflecting surfaces are interjected, causing a plurality of propagation paths, the problem is made more complex. Not only is the risk higher that some signal energy will be lost at the receiver causing deterioration of the signal to noise ratio, but the plurality of different time delays introduced by the unpredictable reflective signal paths may cause the signal to generate its own noise, further reducing the effective signal to noise ratio in the receiver front end.

Figure 1:
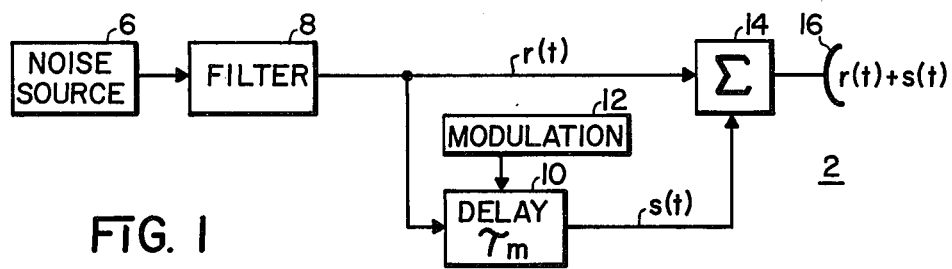
Figure 2:
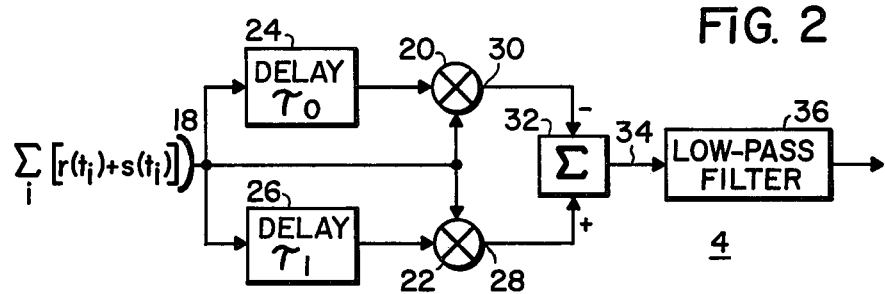

The system of the instant invention utilizes transmitter 2 of FIG. 1 and receiver 4 of FIG. 2 in combination to overcome these problems. More specifically, transmitter 2 (FIG. 1) comprises noise source 6 which provides a relatively wide noise spectrum output. The output from noise source 6 is fed to filter 8 which is a bandpass filter for limiting the output reference spectrum, $r(t)$, to a spectrum centered about a desired transmitter "carrier" frequency, $f_o$. Noise source 6 may be any noise source type such as pseudo-noise or KTB. The spectrum $r(t)$ must be wide compared to the expected reciprocal of the path delays of the multipaths to impose the limitation that the autocorrelation function width of $r(t)$ be narrow compared to expected multipath separations in time. Reference signal $r(t)$, is fed to delay circuit 10 which provides a time delay, $\tau_m$. The output of delay circuit 10 is a delayed signal, $s(t)$. Signals $r(t)$ and $s(t)$ are added in summer 14 and radiated from antenna 16. The output of summer 14 is the superimposed combination noise signal, $r(t)$, + $s(t)$.

Delay 10 is controlled by modulator 12. The range of delay, $\tau_m$, from delay circuit 10 must be selected to be either short compared to interpath delays or significantly long so that $\tau_m$ never "matches" an interpath delay.

For illustration, a binary digital transmission signal will be used in the following explanation of one embodiment of the invention. Within the limitations, already mentioned above, on the range of delay $\tau_m$, modulator 12 supplies either a delay value for $\tau_m$ of $\tau_o$ for a "zero" or of $\tau_l$ for a "one" input. $\tau_m$ therefore takes one of only two values. This means that signal $s(t)$ is delayed from reference $r(t)$ by a time delay of either $\tau_o$ or $\tau_l$. This is illustrated in very simple form by timing diagrams A and G of FIG. 3. There represented are illustrations of the aforementioned delays as they would appear if $r(t)$ consisted of a single noise spike or pulse. The second pulse in timing diagram A which is labeled "1" represents the delay from reference signal "REF" (or $r(t)$) which results when modulator 12 provides a "one" delay in delay circuit 10 (FIG. 1). Similarly, timing diagram G illustrates the resulting delay $\tau_o$ when a "zero" is applied from modulator 12. The reader should recall that $\tau_o$ and $\tau_l$ are special cases of $\tau_m$ and that the constraints on $\tau_m$ apply to each $\tau_o$ and $\tau_l$. To summarize, then, the signal $r(t) + s(t)$ from summer 14 is composed of superimposed noise signals $r(t)$ and $s(t)$ where $s(t)$ is identical to $r(t)$ except that it is delayed by time $\tau_o$ if delay circuit 10 is controlled by a "zero" input and by $\tau_l$ if delay circuit 10 is controlled by a "one". The noise spectrum is centered at a "carrier" frequency, $f_o$, and is transmitted by antenna 16.

Receiver 4 (see FIG. 2) receives signal $\Sigma_i[r(t_i) + s(t_i)]$ on antenna 18. The combined signal is applied to one input of multipliers 20, 22 and to delay circuits 24, 26. The expression $\Sigma_i[r(t_i) + s(t_i)]$ is used to indicate that there are multiple delays involved in the transmission of each of $r(t)$ and $s(t)$ due to multipath effects, previously discussed. This may be seen as simply illustrated in timing diagrams B, C, D, H, K and L of FIG. 3. For example, in timing diagram B of FIG. 3, signals $\alpha_1$, $\alpha_2$, $\alpha_3$, and $\alpha_4$ are shown at times $T_1$, $T_2$, $T_3$ and $T_4$ respectively. Each has an associated amplitude. Both the delay and the amplitude are a function of the particular propagation path followed by each segment of the signal. It will be clear that the shortest delay is associated with $\alpha_1$ because it followed the shortest propagation path from transmitter 2 to receiver 4. If this is a line-of-sight path, it will be the shortest delay possible. But a line-of-sight path does not always exist, so the delay represented by signal $\alpha_1$ may not be the minimum delay possible in the system. Likewise, one would normally expect that the amplitude of the line-of-sight signal might be the largest amplitude of the plurality of signals shown. But there may not be a line-of-sight signal and even when there is, it is possible that multipath signals may demonstrate higher amplitude levels due to attenuation over the line-of-sight path compared to that of some of the reflective paths. This is explanatory of the hypothetical timing diagrams shown in FIG. 3. Signal $\alpha_1$ is lower in amplitude than longer delayed signal $\alpha_2$ and larger than signals $\alpha_3$ and $\alpha_4$.

Now, still referring to timing diagram B, FIG. 3, note that $\alpha_1'$ is delayed from $\alpha_1$ by time, $\tau_1$. This is because $\alpha_1'$ results from and corresponds to signal "1" of timing diagram A. Note, too, that timing diagram B illustrates the fact that $\alpha_2$ and $\alpha_2'$, $\alpha_3$ and $\alpha_3'$, and $\alpha_4$ and $\alpha_4'$ are also all separated in time by $\tau_1$.

Now consider receiver 4 of FIG. 2. The input signal is fed directly to multiplier 22 and to delay circuit 26 which delays the input signal by time $\tau_1$ before applying it to a second input to multiplier 22. Multiplier 22 is an autocorrelation generator. If the inputs are the same, a true output results; if the inputs are different, a false output results. The output at terminal 28, then, is the correlation output of the signals of timing diagrams B and C, FIG. 3. The output at terminal 28 is as shown on timing diagram E, FIG. 3. Note that this output is true at those times when the signals of timing diagrams B and C coincide in time. They will coincide in time when delay circuit 26 in receiver 4 delays the signal by $\tau_1$ and the corresponding transmitter 2 signal was delayed by the same $\tau_l$ value as in timing diagram A. If, however, the signal from transmitter 2 was delayed by time $\tau_o$ (see FIG. 3, timing diagram G), the received signal as shown at timing diagram H would have no correlation with the signal at the output of delay circuit 26 which provides delay of time $\tau_1$. This may be seen by comparing timing diagrams H (the received signal when transmitter 2 has provided a delay of $\tau_o$) and K (the same transmitter 2 signal delayed in receiver 4 by time $\tau_1$).

Similarly, a signal delayed by transmitter 2 for time $\tau_o$ is also applied in receiver 4 to multiplier 20 and to delay circuit 24. Delay circuit 24 provides a fixed delay exactly equal to delay $\tau_o$ of transmitter 2. As may be seen by inspection of timing diagrams H (the received signal when transmitter 2 provides a delay of $\tau_o$) and L (the same signal delayed $\tau_o$ by delay circuit 24), signals $\alpha_1$, $\alpha_2$, $\alpha_3$ and $\alpha_4$ of timing diagram L coincide in time with signals $\alpha_1'$, $\alpha_2'$, $\alpha_3'$ and $\alpha_4'$ of timing diagram H. This allows multiplier 20 to produce a correlation signal at terminal 30 (FIG. 2) as illustrated by signals $\alpha_1''$, $\alpha_2''$, $\alpha_3''$ and $\alpha_4''$ in timing diagram N of FIG. 3.

Also, similar to the description, above, of delay circuit 26 channel, a signal delayed by transmitter 2 for $\tau_1$ time which is passed through delay circuit 24 providing a $\tau_o$ delay to multiplier 20 will provide no correlation output at terminal 30.

The correlation signals from terminals 28 and 30 are combined in summer 32. However, they are processed to provide a negative output at output terminal 34 of summer 32 for a "zero" input and a positive output at terminal 34 of summer 32 for a "one" input. Clearly, this convention could be reversed or some other combining system could be utilized to provide the required output levels for a particular system.

The combined output correlation signal at terminal 34 of summer 32 is then passed through low pass filter 36 to provide integration or "smoothing" of the combined signal.

It is an important aspect of the invention that correlation occurs between each and every signal resulting from multipath delay times. This is made possible by the reasonable assumption that the delays caused by multipath propagation will not change during the system imposed delay time range of $\tau_m$. That is, the total range of $\tau_m$ is short compared to the rate of change of the multipath delay changes. It is clear, then, that the range of $\tau_m$ must be a design consideration and must be set as a function of the rate of change of multipath time delays which are expected in the operating environment.

In the standard prior art transmitted reference system the response to each path depends upon the offset channel frequency phase variation. Since the bandwidth must be wide, i.e. such that the reciprocal is less than the multipath time delay separations, the net output signal adds vectorially and is therefore subject to typical fading problems.

The problem described above is circumvented by the system of the invention. For the binary case $$r(t) = x(t) \cos \omega_o t - y(t) \sin \omega_o t$$

and $$s(t) = r(t - \tau_m) = x(t - \tau_m) \cos \omega_o(t - \tau_m) - y(t - \tau_m) \sin \omega_o(t - \tau_m).$$

The modulation is applied by changing $\tau_m$. For binary cases $\tau_m = \tau_o$ for a "zero" and $\tau_1$ for a "one". The signal $s(t)$ has the same spectrum as $r(t)$ but is displaced in time by $\tau_o$ or $\tau_1$.

The received signal is $\Sigma_i[r(t_i) + s(t_i)]$. This signal is used as the reference to both multipliers. It is also displaced by a delay equal to $\tau_o$ and applied to one multiplier and by $\tau_1$ and applied to the second multiplier. The resultant products are differenced and integrated in the output low pass filter (LPF).

The output of multiplier 20, FIG. 2, is proportional to the expected value of $$\sum_{i,j} E[r(t_i) + s(t_i)][r(t_j - \tau_o) + s(t_j - \tau_o)]$$

$$= \sum_{i,j} E[r(t_i) + r(t_i - \tau_m)][r(t_j - \tau_o) + r(t_j - \tau_m - \tau_o)]$$

$$= \sum_{i,j} E[r(t_i)r(t_j - \tau_o) + r(t_i)r(t_j - \tau_m - \tau_o) + r(t_i - \tau_m)r(t_j - \tau_o) + r(t_i - \tau_m)r(t_j - \tau_m - \tau_o)]$$

$$= \sum_{i,j} [\phi(t_i - t_j + \tau_o) + \phi(t_i - t_j + \tau_m + \tau_o) + \phi(t_i - t_j - \tau_m + \tau_o) + \phi(t_i - t_j + \tau_o)]$$

$\phi(\tau)$ is the autocorrelation function of $r(t)$. $\tau_m$ must be large compared to $1/W$ where $W$ is the bandwidth of the signal. There are two conditions, first $|t_i - t_j| > 1/W$ for all $i \neq j$ and $|t_i - t_j| << \tau_m$ for all $i$ and $j$. Then all terms are essentially zero except the third when and only when $\tau_m = \tau_o$ and $\tau_i = \tau_j$ such as might occur when transmitting binary data. Any noise source 6, FIG. 1, may be used, pseudo-noise or KTB noise. The bandwidth of the source must be wide compared to the expected reciprocal of the path delays of this multipath. This implies that the autocorrelation function width of $r(t)$ is narrow compared to the projected path separation. The range of the delay, $\tau_m$, must be selected to be either short compared to interpath delays or significantly long such that $\tau_m$ never "matches" an interpath delay.

Receiver 2, illustrated, is for binary transmission when $\tau_o$ and $\tau_1$ represent the two possible values of $\tau_m$. (Linear time modulation requires only one channel and $\tau_o$ is selected to be the maximum or minimum value of $\tau_m$.)

The output becomes $$\sum_i \phi(\tau_o - \tau_m)$$

In the above analysis, the magnitudes of each path have been ignored. The last equation can be interpreted as $$\phi(\tau_o - \tau_m) \sum_i P_i,$$

$P_i = P/2 =$ power in the $i^{th}$ path for either the signal or the reference.

Notice that all terms have added algebraically, not vectorally as in the standard approach.

The lower channel output is by analogy $$\phi(\tau_1 - \tau_m) \sum_i P_i$$

Where either $\tau_m = \tau_o$ or $\tau_1$. One channel and only one channel has significant output.

If, however, $|t_i - t_j| < 1/W$ for some $i \neq j$ then the result is $$\sum_{i,j} \phi(t_i - t_j)$$

for those $i$ and $j$ such that the condition is met. In this case $$\phi(t_i - t_j) = E\{[X(t_i) \cos \omega_o t_i - y(t_i)\sin \omega_o t_i][X(t_j) \cos \omega_o t_j - y(t_j)\sin \omega_o t_j]\}$$

$$\phi(t_i - t_j) = [\phi_x(t_i - t_j) + \phi_y(t_i - t_j)] \cos \omega_o(t_i - t_j)$$

For distinct $i$ and $j$ the $\omega_o(t_i - t_j)$ can be expected to be uniformly distributed from $-\pi$ to $\pi$ and vector addition occurs.

Thus, the system can realiably combat multipath so long as the path differential delays exceed the reciprocal of the bandwidth.

Figure 4:
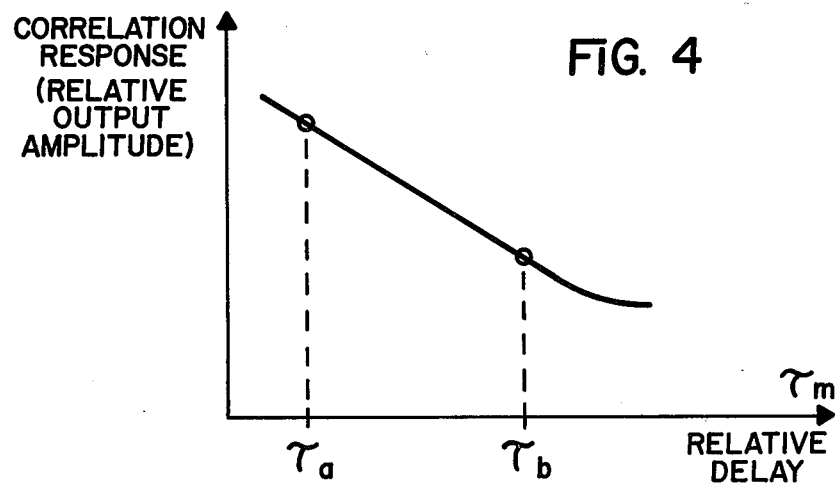

As beforementioned, the system of the invention is not limited to binary digital signal transmissions. Timing diagram P, FIG. 3, illustrates a possible exploded view of the transmitted reference signal at receiver 4 input. More important, it illustrates the necessary autocorrelation function characteristics in the transmitted signal. The "pulses" in the timing diagram, FIG. 3, may be interpreted as epoch times in continuous transmissions, for example; pseudo-noise systems may be shift register generated codes of arbitrary length which are bi-phase or quadra-phase modulated on a carrier or properly filtered random noise from any source. Where linear, as opposed to non-linear, modulation is desired, the value of $\tau_m$ may take values within a continuous range of values. FIG. 4 illustrates the case where $\tau_m$ takes values from $\tau_a$ to $\tau_b$ on a continuous rather than on a discrete stepped scale which has been assumed in the binary modulation system, above. It is important, of course, that for good linear system response, the curve of FIG. 4 be a straight or nearly straight line, as shown, between points $\tau_a$ and $\tau_b$. $\tau_a$ may be a fixed minimum delay and modulator 12, FIG. 1 would act to increase $\tau_m$ to a maximum of $\tau_b$ or, conversely, $\tau_b$ may be a fixed maximum delay and modulator 12 would act to decrease $\tau_m$ to a minimum of $\tau_a$. In either case, $\tau_a$ and $\tau_b$ must lie within the range restrictions for $\tau_m$ as previously discussed.

In a linear system embodiment of the invention, it is not necessary or even desirable to provide a two delay channel receiver as portrayed in FIG. 2. A single fixed delay equal to either $\tau_a$ or $\tau_b$ is used as a receiver reference. The receiver must then respond to the difference between the chosen fixed reference delay and the delay in the received signal. In other words, the correlation function should decline as the difference in delays increases and the declination must be linear within the constraints of required linearity in the system in order to provide intelligent communications.

Various other modifications and changes may be made to the present invention from the principles of the invention described above without departing from the spirit and scope thereof, as encompassed in the following claims.

What is claimed is:

1. A system for transmission of communications signals comprising in combination:

a transmitter, said transmitter further comprising:
   means for generating a reference noise signal having a predetermined bandwidth and having a predetermined center frequency;
   means for delaying said reference noise signal, said delaying means being responsive to the communication signals to provide a plurality of delays ranging from a predetermined minimum to a predetermined maximum delay time;
   means for summing said reference noise signal and said delayed reference noise signal; and
   means for radiating said summed reference noise and delayed reference noise signals; and a receiver, said receiver further comprising:
   means for receiving said radiated summed signals;
   means for time delaying said received summed signals, said time delay means providing at least one fixed time delay corresponding to one of said predetermined time delays in said transmitter;
   at least one means for multiplying said summed signals by said delayed summed signals to provide product signals;
   means for differencing said product signals to recover the communication signals; and
   means for algebraically integrating the recovered communication signals.

2. A method for communicating by means of radio wave radiation comprising the steps of:
   generating a noisy reference signal;
   delaying said noisy reference signal in time as a function of a desired communications signal, said time delay varying from a predetermined minimum to a predetermined maximum;
   combining said noisy reference signal with said delayed noisy reference signal;
   transmitting said combined signal from one location;
   receiving said combined signal to a second location;
   delaying said combined signal by a time equal to at least one of said predetermined minimum and predetermined maximum time delays;
   correlating said delayed combined signal and said combined signal; and
   outputting said desired communications signal responsive to said correlating step.

* * * * *